United States Patent Office.

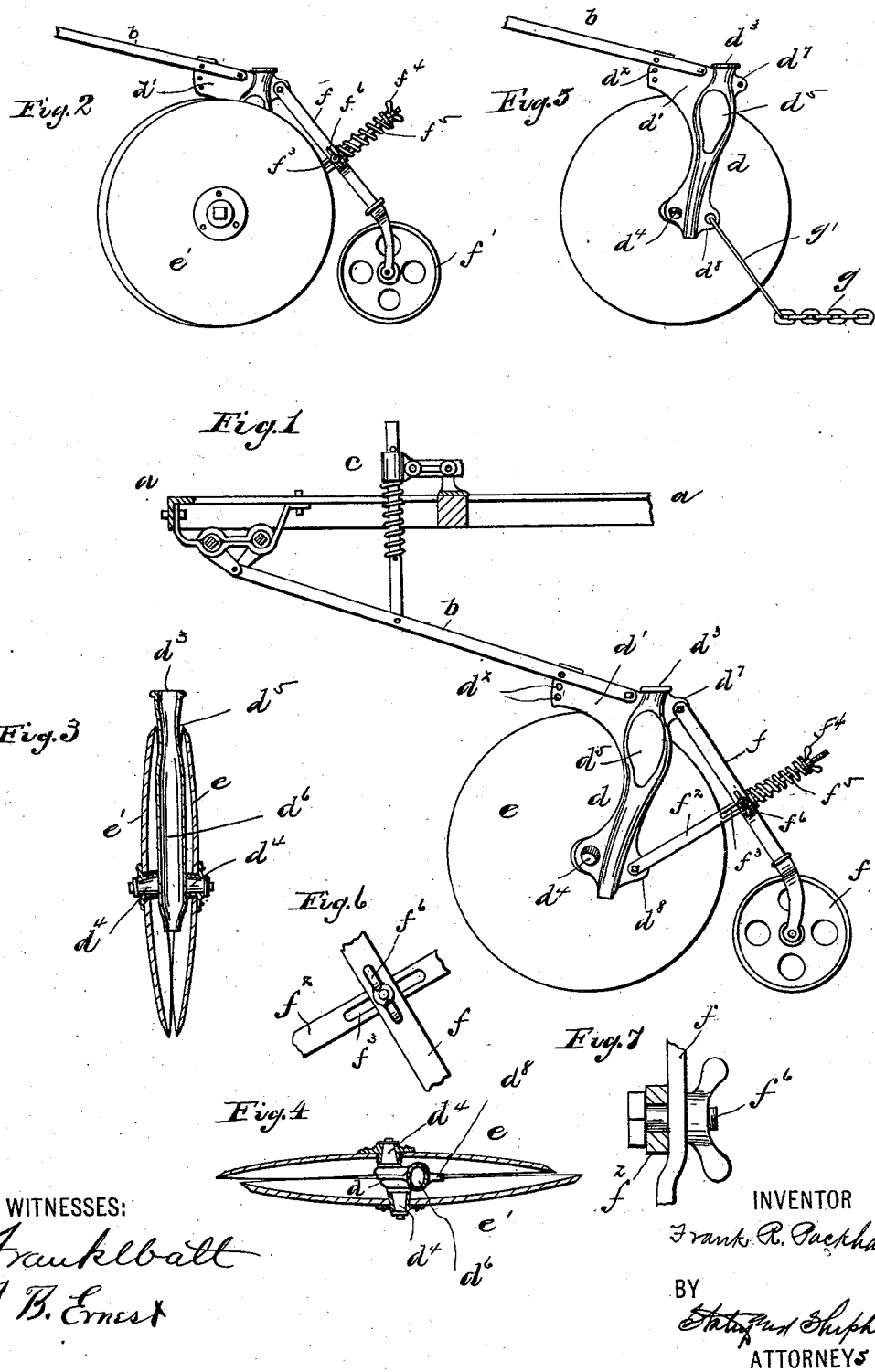

FRANK R. PACKHAM, OF SPRINGFIELD, OHIO, ASSIGNOR TO THE SUPERIOR DRILL COMPANY, OF SAME PLACE.

SEEDER.

SPECIFICATION forming part of Letters Patent No. 522,329, dated July 3, 1894.

Application filed August 3, 1893. Serial No. 482,238. (No model.)

*To all whom it may concern:*

Be it known that I, FRANK R. PACKHAM, a citizen of the United States, residing at Springfield, in the county of Clark and State of Ohio, have invented a certain new and useful Improvement in Seeders, of which the following is a specification.

My invention relates to improvements in seeding devices, and it especially relates to devices for forming the furrow and covering the seed discharged from grain drills or similar seeding devices.

The object of my invention is to provide a simple construction of a planting device adapted to be readily attached to a grain drill, or other seeding machine, and take the place of the ordinary planting shoes; the constructions being such that the furrow, into which the seed is dropped, is formed by revolving disks or colters.

My invention consists in the various constructions and combinations of parts hereinafter described and pointed out in the claims.

In the accompanying drawings Figure 1 is a partial sectional view of a portion of a grain drill to which my improved device is shown attached; one of the disks being removed. Fig. 2 is a side elevation view of my improved device. Fig. 3 is a vertical section, and Fig. 4 a horizontal section of the same. Fig. 5 is a side elevation showing a slight modification. Figs. 6 and 7 are details, hereinafter referred to.

Like parts are represented by similar letters of reference in the several views.

In the said drawings $a\,a$, represents the frame of an ordinary grain drill; $b$, represents the drag bars connected thereto in the usual manner; $c$, represents a pressure device as employed for raising the planting shoes or hoes and exerting pressure thereon; $d$, is a hollow supporting standard and seed tube, which is provided with a forwardly projecting arm $d'$, adapted to be pivoted to the drag bars and provided with a series of perforations $d^2$, by means of which the angle of said standard may be changed with reference to the drag bars. This seed tube or standard $d$, is provided at the top with an enlarged mouth or opening $d^3$, adapted to receive the conduit which extends from the feeding devices; the standard being further provided near the bottom with oppositely projecting studs or bosses $d^4$, in front of the hollow tube or conduit. These bosses $d^4$, are preferably formed tapering and arranged with their axes at an angle to each other. On each of the said bosses is journaled a revolving disk $e, e'$. Each of the disks is concave and preferably formed of steel, in the usual manner, and are journaled on the bosses $d^4$, with their concave sides inwardly; the angularity of the said bosses being such as to cause the disks to meet at one point only and to gradually separate therefrom; the meeting point being preferably located slightly in front of and below the pivotal center.

It is desirable that the disks be so arranged that the cutting edge of one disk stands ahead of the cutting edge of the other disk; it is also desirable that the point of travel of the respective disks, where they come in contact, should move at different rates of speed. To accomplish this I preferably place one of the bosses $d^4$, in advance of the other and make the disks of a uniform size; one disk being, however, adapted to stand back of the other and with its outer periphery engaging with the other disk at a point slightly removed inwardly from its outer periphery. The result of this construction is that a single cutting edge is presented slightly in advance of the point where the disks meet; and as the outer periphery of one disk meets the other disk at the point slightly removed inwardly from the outer periphery, the disks at their point of contact travel at different speeds and assist materially in cleaning and preventing any dirt from lodging between the said disks in operation.

In order to secure the discharge of the seed at a point slightly back of the meeting point of the respective disks, and at the same time permit said disks to revolve at the proper angle with reference to each other, I construct the conduit $d$, with a flattened or contracted portion $d^5$; that is to say the tube or conduit $d^6$, is flattened in one direction and elongated in the other direction, so as to retain the same area of opening through the same. This flattened or contracted portion is adapted to come opposite the point where the outer peripheries of the disks pass the conduit at the top; the conduit being flared outwardly and upwardly into the enlarged mouth $d^3$, into which the ordinary conveying tube is discharged. The disks, as before stated, are concave, and when placed together form ample room for the conduit at or near the center; the flattened or contracted portion of the conduit necessary to permit its passage between the disks being limited only to the point where the outer peripheries of the disks pass said conduit.

Arranged at the back of the standard or conduit $d$, is a lug or ear $d^7$, which stands above the respective disks $e, e'$. To this ear is pivoted an arm $f$, which is bifurcated at its lower end and carries a press or covering wheel $f'$; a projecting ear $d^8$, at the bottom of the conduit being adapted to support a pivoted arm or link $f^2$, which is pivoted to said ear and projects upwardly so as to cross the arm $f$. This link $f^2$, is provided with a slotted opening $f^3$, and is preferably contracted at its upper end and screw-threaded to receive an adjusting screw $f^4$, which bears against a spring $f^5$, placed between said screw and the arm $f$. A thumb-screw or other fastening device $f^6$, passes through the slotted opening $f^3$, and through the perforation in the arm $f$, and furnishes means for holding the link and arm together, and, when desired, for fastening them rigidly together in any desired position. This construction performs the double purpose of furnishing a press wheel to press and regulate the grain, or a gage wheel to gage the depth at which the planting takes place. By leaving the fastening device $f^6$, loose the pressure of the spring $f^5$, is exerted on the wheel $f'$, which is free to move within certain limits in the slotted opening $f^3$, and thus exert a yielding pressure over the grain which is dropped into the furrow formed by the disks. By setting the arm $f$, at any desired relative position with reference to the link $f^2$, and connecting the same rigidly together by the fastening device $f^6$, the wheel $f'$, serves the purpose of a gage wheel to regulate the depth at which the disks shall enter the ground.

If desired the wheel $f'$, may be replaced by a chain $g$, or other form of covering device, which may be attached directly to the ear $d^8$, by means of a link $g'$, as shown in Fig. 5; the ear $d^8$, as also the arm $f^2$, being adapted to pass between the respective disks at the point where they stand sufficiently open or removed from each other to permit the ready passage of these devices.

It will be seen that by the above construction I provide an attachment or planting device for a seeding machine which may be readily applied to the devices already in use. The openings $d^2$, furnish the means for adjusting the angularity of the supporting standard $d$, with reference to the drag bars, and thus of changing the location of the point at which the disks meet each other with reference to the ground line; that is to say by changing the said standard to a more or less inclined position, the meeting point of the disks may be raised or lowered with reference to the ground line, and thus change the size of the furrow produced by said disks.

Having thus described my invention, I claim—

1. The combination with a hollow supporting standard having concave disks journaled on opposite sides thereof, with the cutting edge of one disk in advance of the cutting edge of the other disk, said disks being journaled at an angle to said standard and to each other so as to contact at the front of said hollow standard, said standard being adapted to form a conduit and being provided with an enlarged mouth above the periphery of the respective disks and having a flattened or elongated portion substantially opposite the periphery of the respective disks, substantially as and for the purpose specified.

2. In a seeding machine, a supporting standard consisting of a hollow conduit having a forwardly projecting arm, said conduit being provided with an enlarged mouth, and a flattened portion below said mouth, concave disks journaled on opposite sides of said standard, said disks being arranged at an angle so as to form a meeting point at the front and below said conduit, and means, substantially as described, for adjusting the position of said standard and thus adjust the meeting point of said disks, substantially as specified.

3. The combination with a hollow standard having the projecting arm, as described, and a drag bar to which said arm is pivoted, angularly arranged disks on opposite sides of said standard, adapted to contact one with the other, and means, substantially as described, for adjusting said standard with reference to said drag bar and thus change the contacting point of said disks, substantially as specified.

4. In a seeder, the combination with a supporting standard having a hollow conduit therein, said standard being provided on opposite sides with oppositely projecting trunnions or bosses, said trunnions or bosses being arranged one in advance of the other, and revolving disks or colters journaled on said trunnions, said trunnions being so arranged that the disks stand at an angle to each other, with the outer edge of one disk contacting with the other disk at a point within its periphery, substantially as specified.

5. In a seeder, a hollow supporting standard adapted to form a conduit, as described, oppositely projecting trunnions arranged in front of said conduit and adapted to support revolving disks, said trunnions being arranged at an angle to each other, with one trunnion slightly in advance of the other, said disks being formed concave, with their concave sides adjacent to said standard, said standard being formed with a reduced or flattened portion to permit the near approach of said disks, substantially as specified.

6. The combination with a hollow supporting standard having a forwardly projecting arm, by means of which said standard is pivoted to a drag bar, cutting disks journaled on opposite sides of said standard, said disks being arranged at an angle to said standard and to each other to cause them to contact, as described, a pivoted arm extending from the rear of said disks, means for adjusting said standard with reference to said drag bar, and a covering device connected to said pivoted arm so as to follow said standard, substantially as specified.

7. In a seeder, a hollow supporting standard having angularly arranged disks on opposite sides thereof, said standard being adapted to form a conduit which is extended to the rear and slightly below the center of said disks, a pivoted arm carrying a wheel connected to said standard, and an adjusting link from said standard to said arm, substantially as and for the purpose specified.

8. A hollow supporting standard having disks journaled on opposite sides thereof at an angle thereto, said standard being adapted to form a conduit extended in the rear of and slightly below the center of said disks, a pivoted arm connected to said standard, and a wheel in said arm, and a spring connected to said arm for producing a yielding pressure on said wheel, substantially as specified.

9. The combination with a hollow standard having the disks journaled at an angle on each side thereof, of a pivoted arm carrying a wheel at the extremity thereof, and a pivoted link extending at an angle to said arm, a spring on said link, and means, substantially as described, for adjustably securing said arm to said link, substantially as specified.

10. A hollow supporting standard adapted to form a conduit, of oppositely extending trunnions arranged in front of said conduit, the axes of said trunnions being arranged at an angle to each other, and one of said trunnions being arranged in front of the other, and revolving concave disks journaled on said trunnions, the angularity of said trunnions being such as to cause the said trunnions to contact at the front and below said conduit, substantially as specified.

11. The combination with the supporting standard having the conduit therein, a forwardly projecting arm and a drag bar pivoted thereto, a series of openings in said arm for adjusting said standard with reference to said drag bar, oppositely extending bosses in front of said conduit, the axes of said bosses being arranged at an angle to each other, rotating disks on said bosses, a pivoted arm connected to the rear of said standard, a pivoted link also connected to said standard so as to cross said arm, a spring on said link adapted to contact with said arm, and means, substantially as described, for adjusting said arm with reference to said link, substantially as specified.

12. The combination with the hollow supporting standard adapted to serve the double purpose of supporting revolving disks and to form a conduit extending between said disks, the disks supported by said standard being journaled in bearings, the axes of which stand at an angle to each other to cause the said disks to meet in advance of and below said conduit, as described, said disks being of a substantially uniform size and one disk being journaled in advance of the other, substantially as specified.

FRANK R. PACKHAM.

In presence of—
JOHN J. MAGEE,
A. H. PARKER.